Patented Dec. 22, 1936

2,065,026

UNITED STATES PATENT OFFICE 2,065,026

POLYNUCLEAR CONDENSATION PRODUCTS CONTAINING KETO GROUPS AND PROCESS OF PRODUCING SAME

Alfred Rieche, Wolfen, Germany, assignor to General Aniline Works Inc., New York, N. Y., a corporation of Delaware No Drawing. Application November 29, 1933, Serial No. 700,364. In Germany December 3, 1932

16 Claims. (Cl. 260—123)

The present invention relates to new condensation products derived from 3-hydroxynaphthalic anhydride and aromatic ortho-dicarboxylic acids and a process of producing said condensation products.

I have found that condensation products which are valuable as dyestuff intermediates are obtained by condensing 3-hydroxynaphthalic anhydride with an aromatic ortho-dicarboxylic acid in the presence of a condensing agent preferably of the type active in the Friedel-Crafts' reaction. The said dicarboxylic acids may be substituted in the aromatic nucleus by halogen and/or alkyl groups. The aromatic ortho-dicarboxylic acids may also be used in the form of their anhydrides or chlorides. By the said reaction compounds are formed which correspond to the general formula

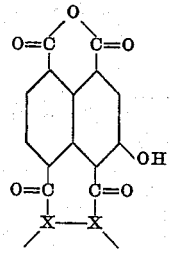

wherein the two X's represent two neighboring carbon atoms of an aromatic nucleus which latter may be substituted by halogen and/or alkyl groups. For example, the condensation of 3-hydroxynaphthalic acid with phthalic anhydride is a very smooth reaction which yields 4, 5-phthaloyl-3-hydroxynaphthalic acid which is a valuable initial material for the preparation of dyestuffs. Instead of phthalic anhydride itself, its homologues or chloro-phthalic anhydrides or naphthalene-2, 3-dicarboxylic acid may be used. The reaction may be carried out in the presence or absence of solvents or diluents. For example, sodium chloride may be employed as a diluent. If phthalic anhydride or its substitution products are used as one of the reagents, it is preferable to employ a considerable excess thereof. In this case the phthalic anhydride acts partly as a diluent. As examples of condensing agents there may be mentioned boron fluoride, ferric chloride, zinc chloride and mixtures of sulphuric acid and boric acid. An especially suitable condensing agent is aluminium chloride.

The reaction is carried out at between about 150° and about 270° to 280° C. preferably between 220° and 260° C.; it proceeds, generally speaking, very smoothly.

When working under mild conditions, for example by heating the reagents only for a short time at temperatures not exceeding 200° C. and using lower amounts of phthalic anhydride or the like than are preferably used in the preparation of the final condensation products corresponding to the above formula, intermediate products may be obtained, which, according to their properties and analyses, are probably derivatives of alpha-naphthoyl-o-benzoic acid. These intermediate products may be readily converted into the said final products, for example by treatment with condensing agents of the kind mentioned above under energetic conditions, for example, at temperatures above 200° C.

The products obtainable according to this invention may be converted by treatment with alkaline or acid agents, such as solutions of alkali metal hydroxides or sulphuric acid, into valuable conversion products, such as benzanthrone dicarboxylic acids or benzanthraquinone dicarboxylic acids, which may also be employed as initial materials for the preparation of dyestuffs.

The following examples will further illustrate the nature of this invention, but the invention is not restricted to these examples. The parts are by weight.

Example 1

120 parts of phthalic anhydride and 30 parts of aluminium chloride are fused together by heating to 250° C. 15 parts of 3-hydroxynaphthalic anhydride are then gradually introduced, the temperature being raised for a short time to 260° C. The phthalic anhydride employed in a considerable excess serves not only as a reagent but also as a diluent. The melt is boiled with water with the addition of a little hydrochloric acid, the reaction product remaining undissolved. By crystallization from nitrobenzene the reaction product is obtained in the form of yellow crystals which melt above 340° C. According to analysis the product formed is 4, 5-phthaloyl-3-hydroxynaphthalic anhydride, corresponding to the formula

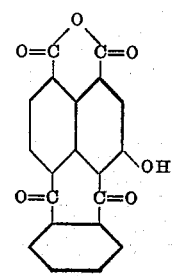

By heating this product for several hours with an aqueous solution of a mixture of sodium hydroxide and potassium permanganate, a compound is obtained in a good yield which is probably Bz3-hydroxybenzanthrone-2,Bz1-dicarboxylic acid. By heating the 4,5-phthaloyl-3-hydroxynaphthalic acid with strong sulphuric acid a substance is obtained, which, according to its properties and to analysis, is Bz2-hydroxy-1,2-benzanthraquinone-3-Bz4-dicarboxylic acid.

*Example 2*

20 parts of aluminium chloride are introduced into 80 parts of molten 4-chlorophthalic anhydride at between 220° and 230° C.; then 10 parts of 3-hydroxynaphthalic anhydride are added at between 240° and 250° C. The latter temperature is maintained for a short time whereupon the reaction mass is allowed to cool and the aluminium chloride and the excess of chlorophthalic anhydride are removed by boiling with water. The water-insoluble residue is a greenish yellow substance which may be purified, for example, by recrystallization from nitrobenzene. It dissolves in solutions of alkali metal hydroxides giving a yellow solution. According to its behaviour it is a chloro-4,5-phthaloyl-3-hydroxynaphthalic anhydride.

By treating an alkaline solution of the reaction product in the warmth with an oxidizing agent, for example, with potassium ferricyanide, the coloration of the solution changes into a brilliant bluish red, a chloro-Bz3-hydroxybenzanthrone-2,Bz1-dicarboxylic acid being thus formed.

*Example 3*

A mixture of 21.5 parts of 3-hydroxynaphthalic anhydride and 15 parts of phthalic anhydride are introduced by and by into a molten mixture of 100 parts of sodium chloride and 400 parts of aluminium chloride at between 220° and 230° C. A temperature between 240° and 250° C. is maintained until the fluorescence in ultraviolet light of samples dissolved in concentrated sulphuric acid is no longer changed by further treatment under said conditions. Then the melt is worked up in the usual manner, and the reaction product is recrystallized from nitrobenzene, if desired. According to its properties it is identical with the compound obtained according to Example 1.

*Example 4*

10 parts of aluminium chloride and subsequently 5 parts of 3-hydroxynaphthalic anhydride are introduced at 180° C. into 40 parts of molten phthalic anhydride. A temperature between 180° and 185° C. is maintained until a sample worked up dissolves in sulphuric acid giving a solution which has a golden-yellow coloration and a red-orange fluorescence in ultra-violet light. Then the reaction mass is worked up as indicated in Example 1, and a condensation product is obtained the properties of which are similar to those of the product of Example 1.

*Example 5*

5 parts of 3-hydroxynaphthalic anhydride are introduced into a melt of 10 parts of finely powdered aluminium chloride and 30 parts of phthalic anhydride at betweeen 160° and 190° C., the temperature being kept within the said range for a short time thereafter. Then the reaction mixture is worked up by boiling with water with the addition of some hydrochloric acid thus removing the aluminium chloride and the excess of phthalic anhydride. After recrystallization from nitrobenzene, the reaction product which is insoluble in water is obtained in the form of colorless, asbestos-like, felt-like needles having no sharp melting point, but melting at about 339° C.

10 parts of the said product are heated together with 20 parts of aluminium chloride and 60 parts of phthalic anhydride at 275° C. As soon as the reaction is completed, the melt is worked up as described in Example 1, a substance being obtained, which according to its properties is identical with that obtained according to Example 1.

What I claim is:—

1. The process of producing condensation products which comprises condensing 3-hydroxynaphthalic anhydride with an aromatic ortho-dicarboxylic acid of the benzene or naphthalene series in the presence of a condensing agent of the type active in the Friedel-Crafts' reaction.

2. The process of producing condensation products which comprises condensing 3-hydroxynaphthalic anhydride with an acid selected from the class consisting of the unsubstituted aromatic ortho-dicarboxylic acids of the benzene and naphthalene series and those which are halogenated in the aromatic nucleus, in the presence of a condensing agent of the type active in the Friedel-Crafts' reaction.

3. The process of producing condensation products which comprises condensing 3-hydroxynaphthalic anhydride with an acid selected from the class consisting of the unsubstituted aromatic ortho-dicarboxylic acids of the benzene and naphthalene series and those which are halogenated in the aromatic nucleus, in the presence of a diluent and a condensing agent of the type active in the Friedel-Crafts' reaction.

4. The process of producing condensation products which comprises condensing 3-hydroxynaphthalic anhydride with an acid selected from the class consisting of the unsubstituted aromatic ortho-dicarboxylic acids of the benzene and naphthalene series and those which are halogenated in the aromatic nucleus, in the presence of aluminium chloride.

5. The process of producing condensation products which comprises condensing 3-hydroxynaphthalic anhydride with phthalic anhydride in the presence of a condensing agent of the type active in the Friedel-Crafts' reaction.

6. The process of producing condensation products which comprises condensing 3-hydroxynaphthalic anhydride with phthalic anhydride in the presence of aluminium chloride.

7. The process of producing condensation products which comprises condensing 3-hydroxynaphthalic anhydride with phthalic anhydride in the presence of aluminium chloride and sodium chloride.

8. The process of producing condensation products which comprises heating 3-hydroxynaphthalic anhydride with an acid selected from the group consisting of the unsubstituted aromatic ortho-dicarboxylic acids of the benzene and naphthalene series and those which are halogenated in the aromatic nucleus, in the presence of aluminium chloride.

9. The process of producing condensation products which comprises heating to between about 150° and about 280° C. 3-hydroxynaphthalic anhydride with an acid selected from the group consisting of the unsubstituted aromatic ortho-dicarboxylic acids of the benzene and naphthalene series and those which are halogenated in the aromatic nucleus, in the presence of a condensing agent of the type active in the Friedel-Crafts' reaction.

10. The process of producing condensation products which comprises heating to between about 150° and about 280° C. 3-hydroxynaphthalic anhydride with an acid selected from the group consisting of the unsubstituted aromatic ortho-dicarboxylic acids of the benzene and naphthalene series and those which are halogenated in the aromatic nucleus, in the presence of aluminium chloride.

11. The process of producing condensation products which comprises heating to between about 150° and about 280° C. 3-hydroxynaphthalic anhydride with an acid selected from the group consisting of the unsubstituted aromatic ortho-dicarboxylic acids of the benzene and naphthalene series and those which are halogenated in the aromatic nucleus, in the presence of a diluent and a condensing agent of the type active in the Friedel-Crafts' reaction.

12. Condensation products corresponding to the general formula

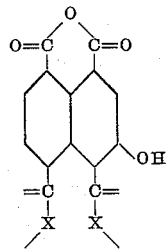

wherein the two X's stand for two neighboring carbon atoms of a nucleus of the benzene or naphthalene series.

13. Condensation products corresponding to the general formula

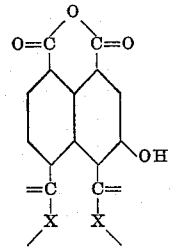

wherein the two X's stand for two neighboring carbon atoms of a nucleus selected from the class consisting of the unsubstituted and the halogenated nuclei of the benzene and naphthalene series.

14. Condensation products selected from the class consisting of the unsubstituted compounds corresponding to the formula

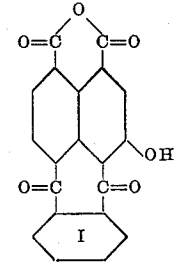

and those which are halogenated in the nucleus marked I.

15. The condensation product corresponding to the formula

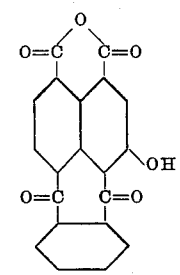

16. The condensation product corresponding to the formula

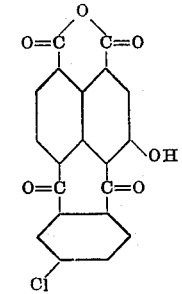

ALFRED RIECHE.